United States Patent
Kanai (10) Patent No.: US 6,735,019 B2
(45) Date of Patent: May 11, 2004

(54) ZOOM EYEPIECE OPTICAL SYSTEM

(75) Inventor: Moriyasu Kanai, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/403,041

(22) Filed: Apr. 1, 2003

(65) Prior Publication Data

US 2003/0202254 A1 Oct. 30, 2003

(30) Foreign Application Priority Data

Apr. 18, 2002 (JP) ........................................ 2002-116551

(51) Int. Cl.[7] .......................... G02B 25/00; G02B 15/14
(52) U.S. Cl. ...................... 359/644; 359/686; 359/434
(58) Field of Search ............................... 359/644, 676, 359/684, 643, 686, 432, 434

(56) References Cited

U.S. PATENT DOCUMENTS

| | | | |
|---|---|---|---|
| 4,249,793 A | * 2/1981 | Uehara | 359/422 |
| 5,663,834 A | * 9/1997 | Koizumi | 359/643 |
| 5,734,509 A | 3/1998 | Ueno | 359/689 |
| 6,229,653 B1 | 5/2001 | Kanai | 359/643 |
| 6,384,984 B1 | 5/2002 | Ishii et al. | 359/645 |

FOREIGN PATENT DOCUMENTS

| | | |
|---|---|---|
| JP | 62134617 | 6/1987 |
| JP | 6175048 | 6/1994 |
| JP | 2000-180736 | 6/2000 |
| JP | 2001242390 | 9/2001 |

OTHER PUBLICATIONS

English Language Translation of JP Appln. No. 62–134617.

\* cited by examiner

Primary Examiner—Evelyn A. Lester
(74) Attorney, Agent, or Firm—Greenblum & Bernstein, P.L.C.

(57) ABSTRACT

A zoom eyepiece optical system, which is used with an objective optical system, includes a first lens group which is stationary with respect to the objective optical system, a negative second lens group which is movable upon zooming, a positive third lens group which is movable upon zooming, and a stationary positive fourth lens group, in this order from the objective optical system. Upon zooming from the long focal length extremity to the short focal length extremity of the zoom eyepiece optical system, the negative second lens group and the positive third lens group move away from each other, and an intermediate image is formed between the negative second lens group and the positive third lens group.

5 Claims, 8 Drawing Sheets

SPHERICAL
ABERRATION

CHROMATIC
ABERRATION

Fig. 6B

LATERAL
CHROMATIC
ABERRATION

Fig. 6C

ASTIGMATISM

Fig. 6D

DISTORTION

ZOOM EYEPIECE OPTICAL SYSTEM

BACKGROUND OF THE INVENTION

1. Field of the Invention

The present invention relates to a compact zoom eyepiece optical system applied to binoculars, astronomical telescopes, or the like.

2. Description of the Related Art

Generally, a zoom eyepiece optical system, which is used in combination with an objective optical system, includes a negative powered (hereinafter, negative) first lens group which is movable upon zooming, a positive powered (hereinafter, positive) second lens group which is movable upon zooming, and a stationary positive third lens group, in this order from the objective optical system. According to the above arrangement, an intermediate image is formed between the negative first group and the positive second lens group. An optical system, such as ones described above, have been disclosed in, for example, in Japanese Unexamined Patent Publication Nos. Sho-62-134617 and Hei-6-175048.

In the above-described conventional zoom eyepiece optical system, the negative first lens group is provided on the object-side of the intermediate image, so that even at the long focal length extremity, the zoom eyepiece optical system can magnify the image formed by the objective optical system. Accordingly, the combined focal length of the positive second lens group and the positive third lens group needs to be made longer with respect to the focal length of the entire optical system. Consequently, the lens diameter becomes considerably large, compared with, e.g., a single focal-length eyepiece lens system having the same focal length.

SUMMARY OF THE INVENTION

The present invention provides a compact zoom eyepiece optical system having a small lens diameter.

According to an aspect of the present invention, there is provided a zoom eyepiece optical system, which is used in combination with an objective optical system, including a first lens group which is stationary with respect to the objective optical system, a negative second lens group which is movable upon zooming, a positive third lens group which is movable upon zooming, and a stationary positive fourth lens group, in this order from the objective optical system. Upon zooming from the long focal length extremity to the short focal length extremity of the zoom eyepiece optical system, the negative second lens group and the positive third lens group move away from each other, and an intermediate image is formed between the negative second lens group and the positive third lens group.

The zoom eyepiece optical system according to the present invention preferably satisfies the following conditions:

$$0.6 < ml < 0.95 \quad (1)$$

$$-0.05 < fL/fl < 0.5 \quad (2)$$

wherein ml designates the lateral magnification of the first lens group when the diopter of a bundle of light rays emitted from the zoom eyepiece optical system is −1 (1/m);

fL designates the focal length of the entire zoom eyepiece optical systems at the long focal length extremity; and fl designates the focal length of the first lens group.

The zoom eyepiece optical system can satisfy the following condition:

$$0.6 < fS_{3-4}/fL < 1.0 \quad (3)$$

wherein $fS_{3-4}$ designates the combined focal length of the positive third lens group and the positive fourth lens group at the short focal length extremity.

The zoom eyepiece optical system preferably satisfies the following condition:

$$0.9 < fL_{3-4}/fL < 1.2 \quad (4)$$

wherein $fL_{3-4}$ designates the combined focal length of the positive third lens group and the positive fourth lens group at the long focal length extremity.

The first lens group preferably includes a single lens element for the purpose of cost reduction.

The present disclosure relates to subject matter contained in Japanese Patent Application No. 2002-116551 (filed on Apr. 18, 2002) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 13:
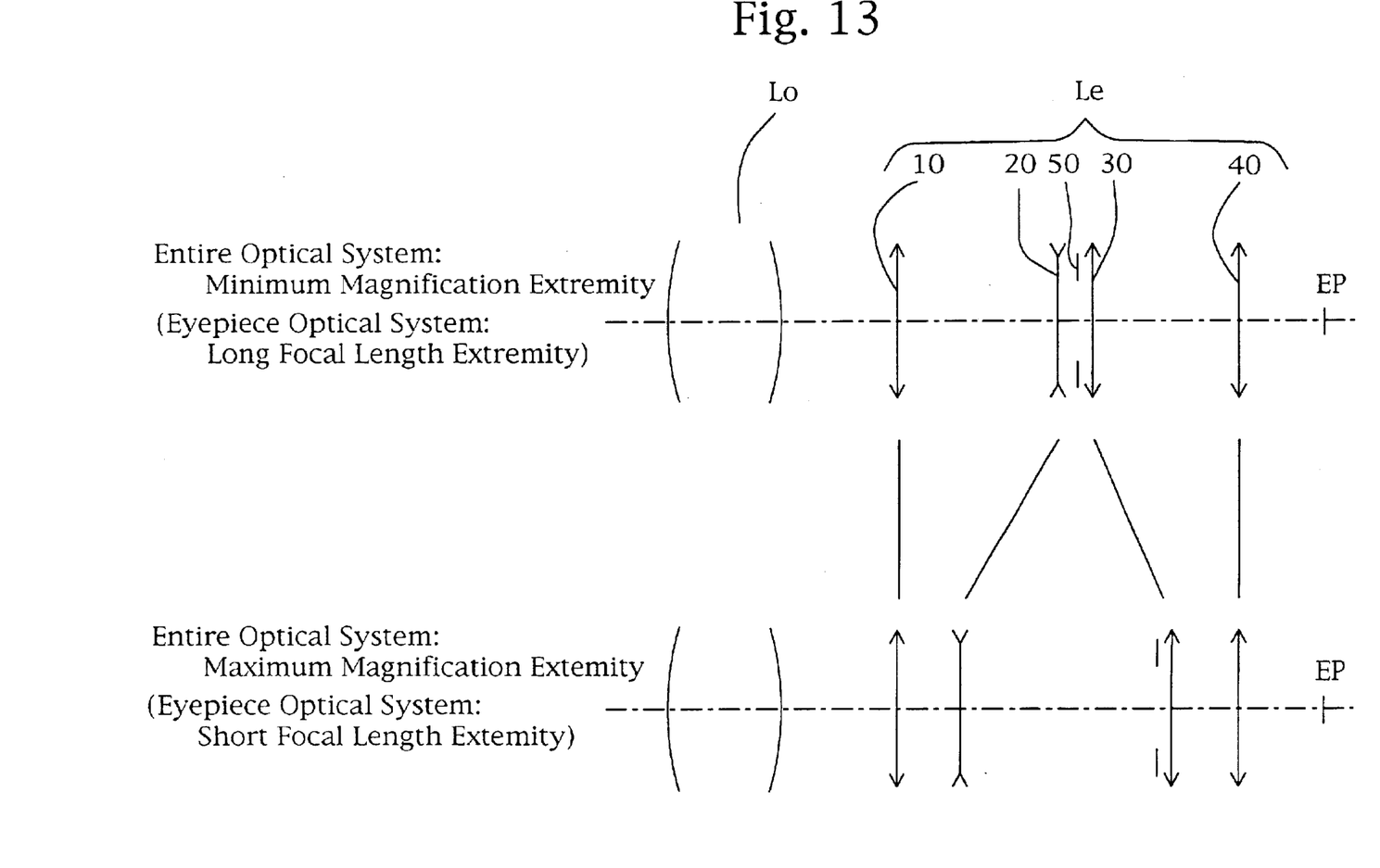
FIG. 13 shows schematic lens-group moving paths of the zoom viewing optical system according to the first to fourth embodiments, in the case where the first lens group of the zoom eyepiece optical system has a positive power.
Figure 14:
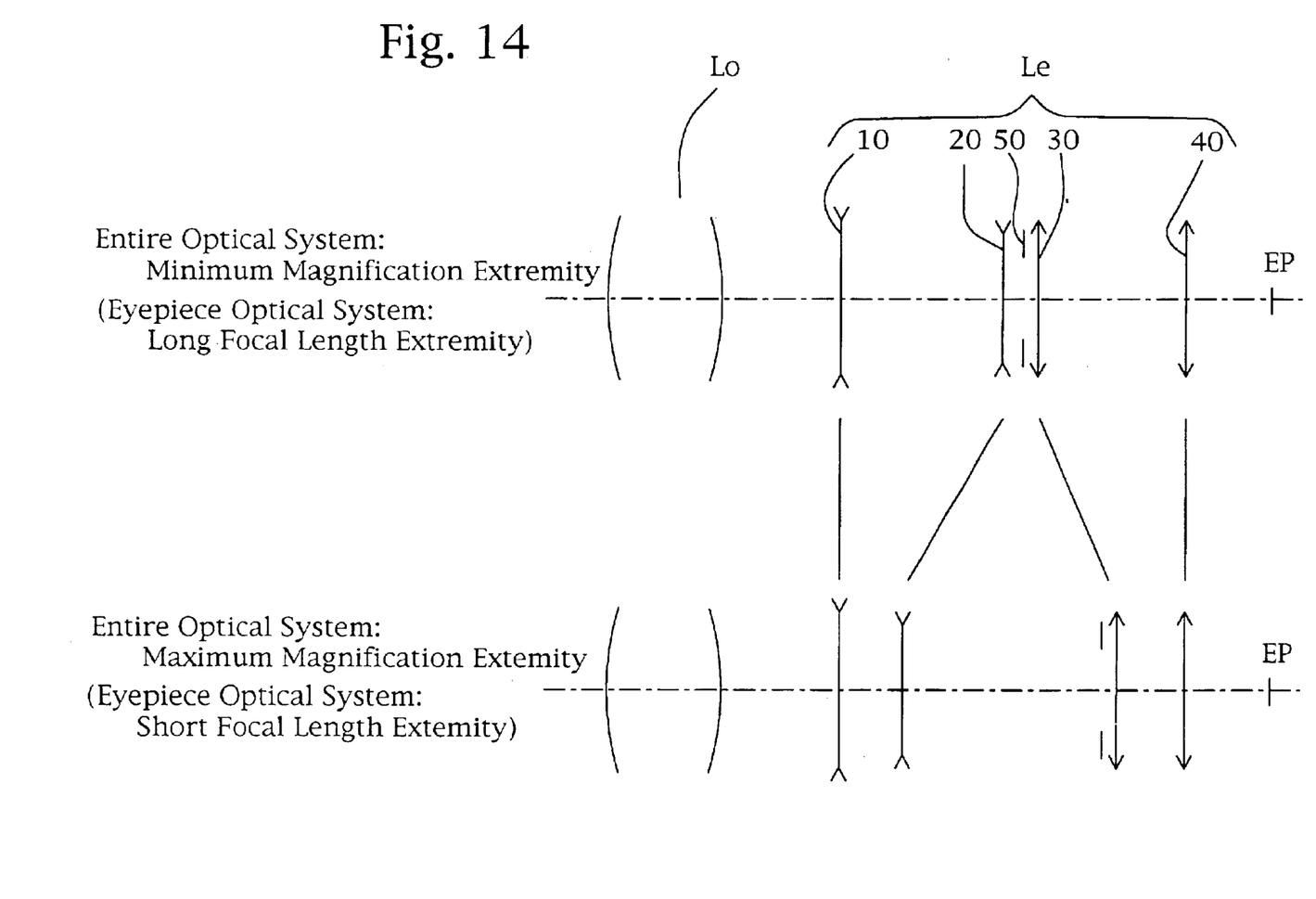
FIG. 14 shows schematic lens-group moving paths of the zoom viewing optical system according to the first to fourth embodiments, in the case where the first lens group of the zoom eyepiece optical system has a slight amount of negative power.

FIGS. 13 and 14 show the schematic lens-group moving paths of the zoom viewing optical system including an objective optical system Lo and a zoom eyepiece optical system Le, in the case where the first lens group of the zoom eyepiece optical system respectively has a positive power (FIG. 13) and a slight amount of negative power (FIG. 14).

The zoom eyepiece optical system Le includes a positive or slightly negative first lens group 10 which is stationary with respect to the objective optical system Lo, a negative second lens group 20 which is movable, a positive third lens group 30 which is movable, and positive fourth lens group 40 which is stationary, in this order from to the objective optical system Lo.

The negative second lens group 20 and the positive third lens group 30 of the zoom eyepiece optical system Le move away from each other upon zooming from the minimum magnification of the zoom viewing optical system (the long focal length extremity of the zoom eyepiece optical system Le) to the maximum magnification of the zoom viewing optical system (the short focal length extremity of the zoom eyepiece optical system Le); and an intermediate image is formed between the negative second lens group 20 and the positive third lens group 30. A field-frame ring 50 which determines the field of view is provided in the vicinity of the intermediate image, and the field-frame ring 50 moves together with the positive third lens group 30. A symbol E.P. designates the eyepoint. One of the features of the present invention is that the stationary first lens group 10 is provided on the side of the objective optical system Lo with respect to the negative second lens group 20 and the positive third lens group 30 which are arranged to perform zooming. The above features will be discussed below.

In a conventional zoom eyepiece optical system, a so-called 'OE zoom' optical system of a three-lens-group arrangement has been employed.

The 'OE zoom' arrangement generally includes, as described above, movable negative lens group for zooming, and a movable positive lens group, and a stationary lens group, in this order from the objective optical system. Here, note that the movable positive lens group performs zooming while the diopter remains unchanged before and after the field-frame ring (intermediate image-forming position).

In such a conventional optical system, both the negative movable lens group and the positive movable lens group are arranged to perform zooming; however, the negative movable lens group mainly perform zooming. Furthermore, the negative movable lens group is positioned on the side of the objective optical system with respect to the field-frame ring (intermediate image-forming position), so that the negative movable lens group always functions as an enlarging optical system which enlarges the image formed by the objective optical system even at the long focal length extremity. Moreover, the enlarging ratio at the long focal length extremity is inevitably increased if an attempt is made to increase the zoom ratio of the zoom eyepiece optical system. Namely, in order to achieve a high zoom ratio obtained by the zoom eyepiece optical system, the enlarging ratio at the long focal length extremity inevitably becomes large; in other words, the power of the negative movable lens group has to be made stronger. As a result, the enlarging ratio at the long focal length extremity becomes large, and hence the lens diameters of the lens groups, in the zoom eyepiece optical system, provided behind the field-frame ring become large.

According to the present invention, a compact zoom eyepiece optical system is achieved by fixedly providing a positive or slightly negative first lens group 10, which makes the size of an image formed by the objective optical system smaller, immediately in front of the negative movable lens group (on the side of the objective optical system Lo). Due to this arrangement, the following can be possible:

(i) the enlarging ratio of the image (formed through the objective optical system Lo) to be formed by the first lens group 10 and the negative second lens group 20 can be maintained smaller;

(ii) the focal length of the entire optical system can be maintained unchanged, (iii) the power of the lens groups behind the first lens group 10 can be made stronger (i.e., a shorter focal length); and (iv) furthermore, if the zoom ratio of the first lens group 10 is up to about 2.5, the first lens group 10 can include a single lens element with minimum deterioration in optical performance, and the first lens group 10 can be made cost effectively.

Condition (1) specifies the lateral magnification of the first lens group 10 having the above-described technical aspects.

If ml exceeds the lower limit of condition (1), the lateral magnification becomes too low, so that the numerical aperture (NA) incident on the negative second lens group 20 becomes large, and the correcting of spherical aberration and coma becomes difficult.

If ml exceeds the upper limit of condition (1), a sufficient reduction ratio with respect to the enlarging ratio of the negative second lens group 20 cannot be achieved, so that further miniaturization of the optical system cannot be achieved.

Condition (2) specifies the power of the first lens group 10 having the above-described technical aspects.

If fL/fl exceeds the lower limit of condition (2), a sufficient reduction ratio with respect to the enlarging ratio of the negative second lens group 20 cannot be achieved, so that further miniaturization of the optical system cannot be achieved.

If fL/fl exceeds the upper limit of condition (2), the entrance pupil position, with respect to the negative second lens group 20 and thereafter, moves toward the eye of the user, so that the eye relief becomes shorter.

Condition (3) specifies the combined focal length of the positive third lens group and the positive fourth lens group at the short focal length extremity. By satisfying this condition, compactness of the optical system is achieved, and a sufficient eye relief at the short focal length extremity is secured.

If the combined focal length of the positive third lens group and the positive fourth lens group becomes extremely short to the extent that $fS_{3-4}/fL$ exceeds the lower limit of condition (3), it becomes difficult to secure an adequate eye relief at the short focal length extremity.

If the combined focal length of the positive third lens group and the positive fourth lens group becomes extremely long to the extent that $fS_{3-4}/fL$ exceeds the upper limit of condition (3), the lens diameters are increased, and it become difficult to attain further compactness.

Condition (4) specifies the combined focal length of the positive third lens group and the positive fourth lens group at the long focal length extremity. By satisfying this condition, compactness of the optical system is achieved, and a sufficient eye relief at the long focal length extremity is secured.

If the combined focal length of the positive third lens group and the positive fourth lens group becomes extremely short to the extent that $fL_{3-4}/fL$ exceeds the lower limit of condition (4), it becomes difficult to secure an adequate eye relief at the long focal length extremity.

If the combined focal length of the positive third lens group and the positive fourth lens group becomes extremely long to the extent that $fL_{3-4}/fL$ exceeds the upper limit of condition (4), the lens diameters are increased, and it become difficult to attain further compactness.

Specific numerical data of the embodiments will be described hereinafter. In the diagrams of chromatic aberration represented by spherical aberration, the solid line and the four types of dotted lines respectively indicate spherical aberrations with respect to the d, g, C, F and e lines; and ER (φ) designates the pupil diameter. Also, in the diagrams of lateral chromatic aberration, the four types of dotted lines respectively indicate magnification with respect to the g, C, F and e lines; and W designates the exit half-angle (°); however, the d line as the base line coincides with the ordinate. In the diagrams of astigmatism, S designates the sagittal image, and M designates the meridional image; and W designates the exit half-angle (°). In the tables, f designates the focal length of the zoom eyepiece optical system, EP designates the eye relief, Di designates the diopter (l/m), R designates the radius of curvature, D designates the lens thickness or distance between lens elements, $N_d$ designates refractive index of the d-line, and ν designates the Abbe number. The object distance designates a distance from the image forming point of the objective optical system Lo, to be combined with the zoom eyepiece optical system, to the first surface of the zoom eyepiece optical system Le of each embodiment.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

Figure 1:
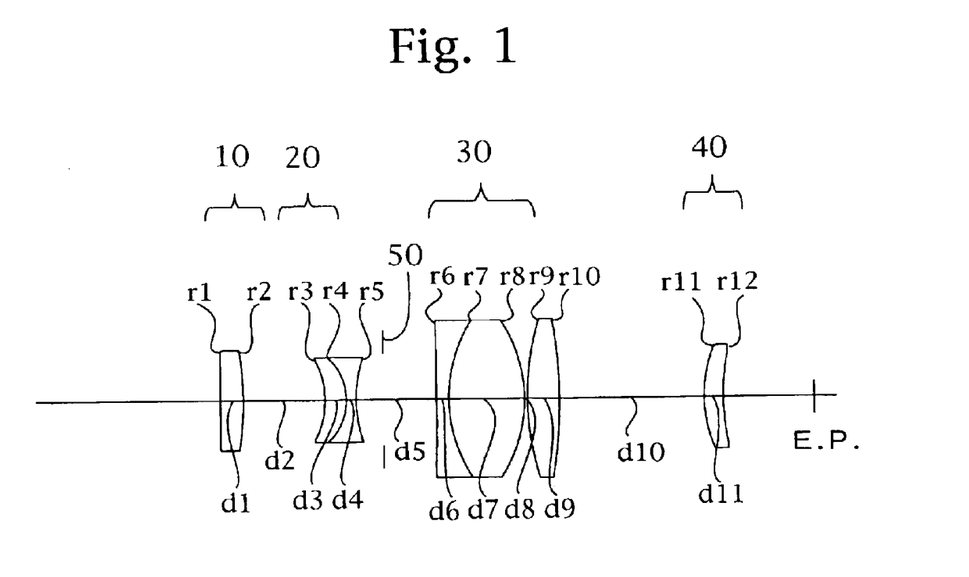
FIG. 1 is a lens arrangement of a zoom eyepiece optical system at the long focal length extremity (the minimum magnification), according to a first embodiment of the present invention.
Figures 2A, 2B, 2C:
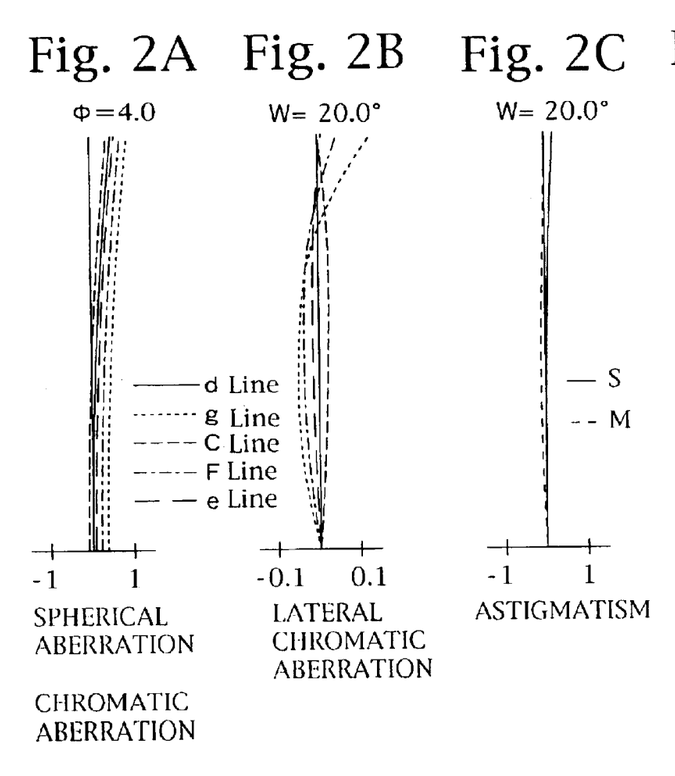
FIGS. 2A, 2B, 2C and 2D show aberrations occurred in the lens arrangement of FIG. 1, in the case where the zoom eyepiece optical system is combined with an objective optical system (f=500, f-number=1:5) having no aberrations, and where a bundle of light rays from infinity is passed therethrough.
Figure 2D:
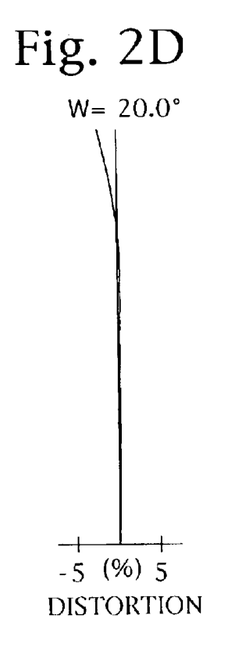
Figure 3:
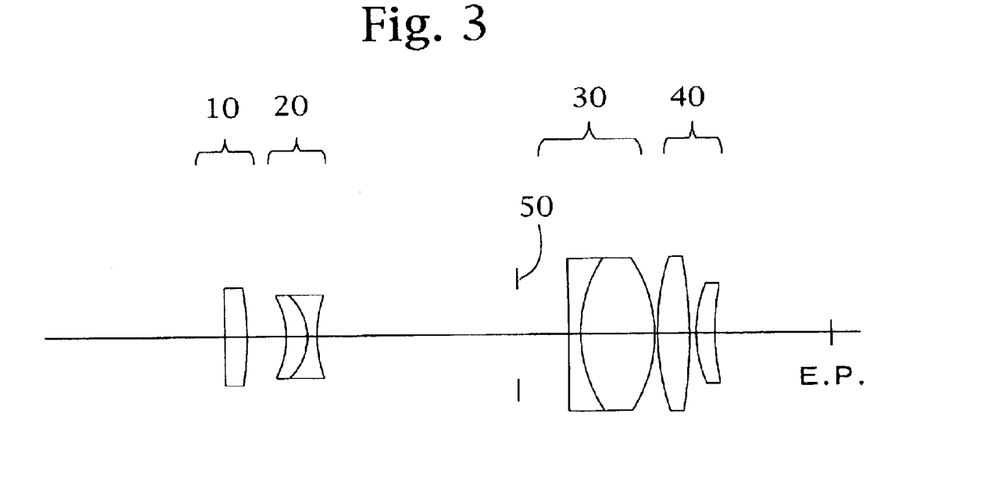
FIG. 3 is a lens arrangement of the zoom eyepiece optical system at the short focal length extremity (the maximum magnification), according to the first embodiment of the present invention.
Figures 4A, 4B:
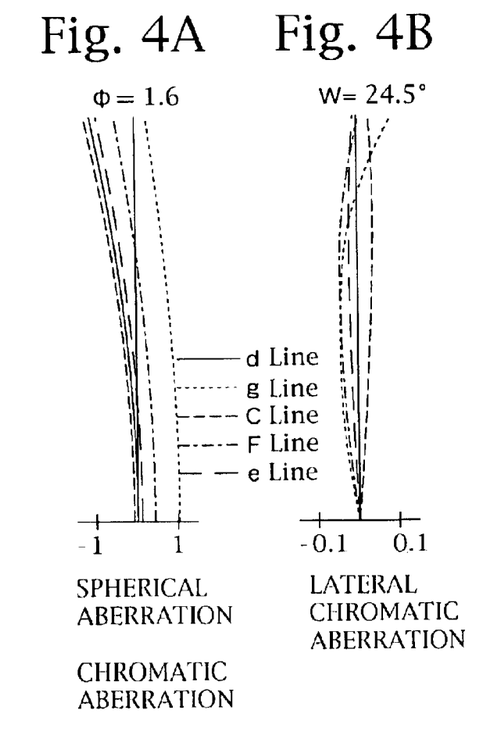
FIGS. 4A, 4B, 4C and 4D show aberrations occurred in the lens arrangement of FIG. 3, in the case where the zoom eyepiece optical system is combined with an objective optical system (f=500, f-number=1:5) having no aberrations, and where a bundle of light rays from infinity is passed therethrough.
Figure 4C:
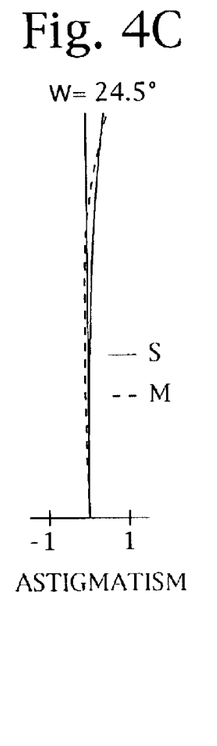
Figure 4D:
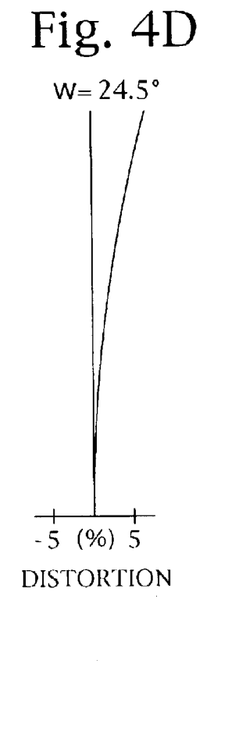

FIG. 1 is the lens arrangement of the zoom eyepiece optical system at the long focal length extremity (the minimum magnification), according to the first embodiment of the present invention. FIGS. 2A through 2D show aberrations occurred in the lens arrangement of FIG. 1, in the case where the zoom eyepiece optical system is combined with an objective optical system (f=500, f-number=1:5) having no aberrations, and where a bundle of light rays from infinity is passed therethrough. FIG. 3 is the lens arrangement of the zoom eyepiece optical system at the short focal length extremity (the maximum magnification), according to the first embodiment of the present invention. FIGS. 4A through 4D show aberrations occurred in the lens arrangement of FIG. 3, in the case where the zoom eyepiece optical system is combined with an objective optical system (f=500, f-number=1:5) having no aberrations, and where a bundle of light rays from infinity is passed therethrough. Table 1 shows the numerical data of the first embodiment.

The first lens group 10 includes a positive single lens element. The negative second lens group 20 includes a cemented lens elements having a positive lens element and a negative lens element. The positive third lens group 30 includes cemented lens elements having a negative lens element and a positive lens element, and a positive single lens element. The positive fourth lens group 40 includes a single lens element. The field-frame ring 50 is provided 8.94 mm from the positive third lens group 30 (surface No. 6) toward the negative second lens group 20, and moves together with the positive third lens group 30.

TABLE 1

Object Distance = 28.81
f = 20.00 – 12.43 – 8.30
EP = 10 – 10 – 16
Di = –1.0 – –1.0 – –1.0

| Surface No. | R | D | Nd | ν |
|---|---|---|---|---|
| 1 | ∞ | 3.89 | 1.51633 | 64.1 |
| 2 | –51.820 | 13.81–9.33–6.83 | — | — |
| 3 | –14.686 | 3.63 | 1.51633 | 64.1 |
| 4 | –9.846 | 1.63 | 1.51454 | 54.7 |
| 5 | 22.255 | 13.62–28.29–43.85 | — | — |
| 6 | –557.272 | 2.07 | 1.84666 | 23.8 |
| 7 | 24.314 | 12.82 | 1.69680 | 55.5 |
| 8 | –24.314 | 0.50 | — | — |
| 9 | 44.954 | 5.50 | 1.60311 | 60.7 |
| 10 | –78.378 | 24.45–14.26–1.20 | — | — |
| 11 | 22.663 | 3.24 | 1.51633 | 64.1 |
| 12 | 40.549 | — | — | — |

[Embodiment 2]

Figure 5:
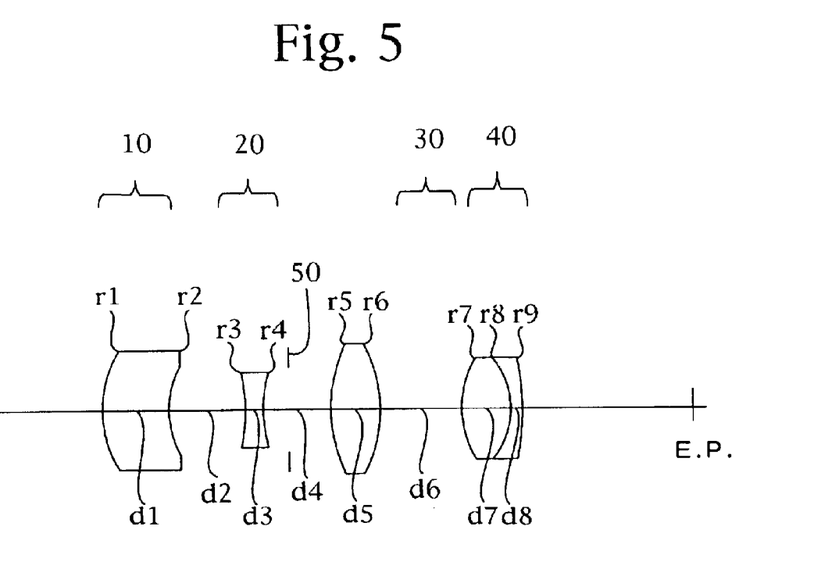
FIG. 5 is a lens arrangement of a zoom eyepiece optical system at the long focal length extremity (the minimum magnification), according to a second embodiment of the present invention.
Figure 6A:
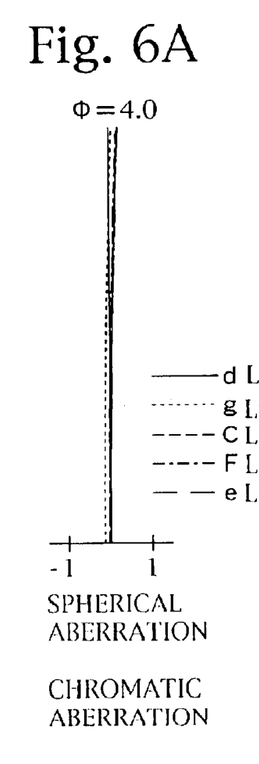
FIGS. 6A, 6B, 6C and 6D show aberrations occurred in the lens arrangement of FIG. 5, in the case where the zoom eyepiece optical system is combined with an objective optical system (f=500, f-number=1:5) having no aberrations, and where a bundle of light rays from infinity is passed therethrough.
Figure 6B:
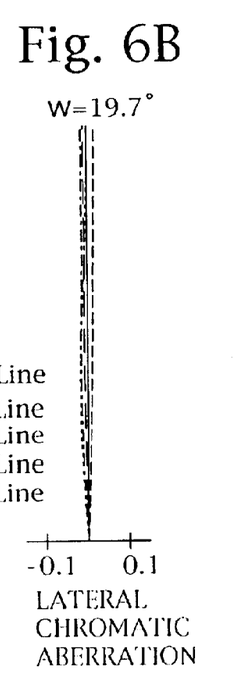
Figure 6C:
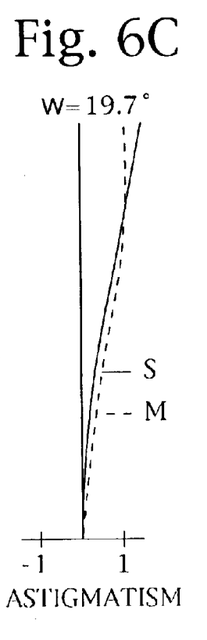
Figure 6D:
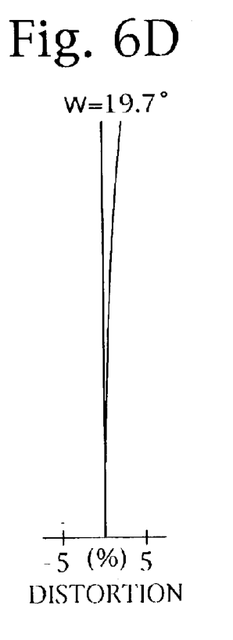
Figure 7:
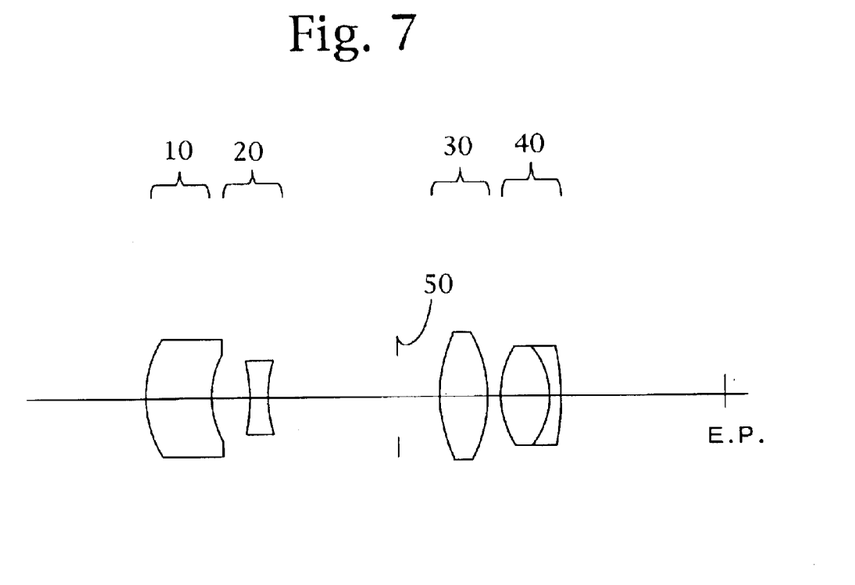
FIG. 7 is a lens arrangement of the zoom eyepiece optical system at the short focal length extremity (the maximum magnification), according to the second embodiment of the present invention.
Figures 8A, 8B, 8C:
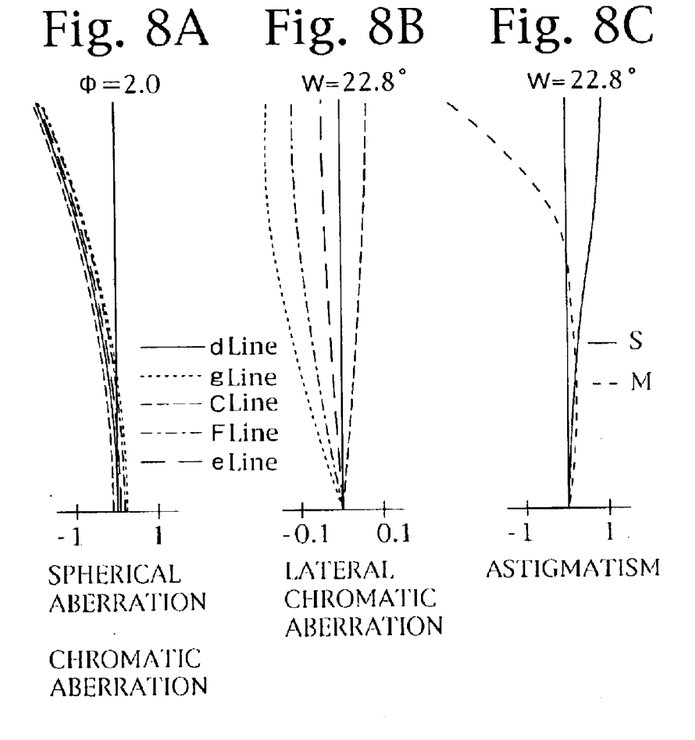
FIGS. 8A, 8B, 8C and 8D show aberrations occurred in the lens arrangement of FIG. 7, in the case where the zoom eyepiece optical system is combined with an objective optical system (f=500, f-number=1:5) having no aberrations, and where a bundle of light rays from infinity is passed therethrough.
Figure 8D:
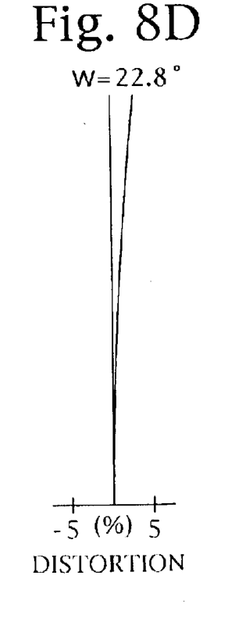

FIG. 5 is the lens arrangement of the zoom eyepiece optical system at the long focal length extremity (the minimum magnification), according to the second embodiment of the present invention. FIGS. 6A through 6D show aberrations occurred in the lens arrangement of FIG. 5, in the case where the zoom eyepiece optical system is combined with an objective optical system (f=500, f-number=1:5) having no aberrations, and where a bundle of light rays from infinity is passed therethrough. FIG. 7 is the lens arrangement of the zoom eyepiece optical system at the short focal length extremity (the maximum magnification), according to the second embodiment of the present invention. FIGS. 8A through 8D show aberrations occurred in the lens arrangement of FIG. 7, in the case where the zoom eyepiece optical system is combined with an objective optical system (f=500, f-number=1:5) having no aberrations, and where a bundle of light rays from infinity is passed therethrough. Table 2 shows the numerical data of the second embodiment.

The first lens group 10 includes a single lens element having a slight amount of negative power. The negative second lens group 20 includes a negative single lens element. The positive third lens group 30 includes a positive single lens element. The positive fourth lens group 40 includes a cemented lens having a positive lens element and a negative lens element. The field-frame ring 50 is provided 7.03 mm from the positive third lens group 30 (surface No. 5) toward the negative second lens group 20 side, and moves together with the positive third lens group 30.

TABLE 2

Object Distance = 38.26
f = 20.00 – 13.23 – 10.15
EP = 14 – 12 – 12
Di = –1.0 – –1.0 – –1.0

| Surface No. | R | D | Nd | ν |
|---|---|---|---|---|
| 1 | 19.170 | 11.25 | 1.51633 | 64.1 |
| 2 | 15.336 | 12.75–8.56–6.58 | — | — |
| 3 | –28.452 | 3.07 | 1.51633 | 64.1 |
| 4 | 21.343 | 11.31–21.83–29.21 | — | — |
| 5* | 19.781 | 8.36 | 1.49176 | 57.4 |
| 6 | –23.004 | 13.90–7.58–2.18 | — | — |
| 7 | 16.218 | 8.31 | 1.51633 | 64.1 |
| 8 | –13.202 | 1.92 | 1.78472 | 25.7 |
| 9 | –42.941 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
|---|---|---|---|
| 5 | 0 | $-0.58304 \times 10^{-4}$ | $0.20668 \times 10^{-6}$ |

[Embodiment 3]

Figure 9:
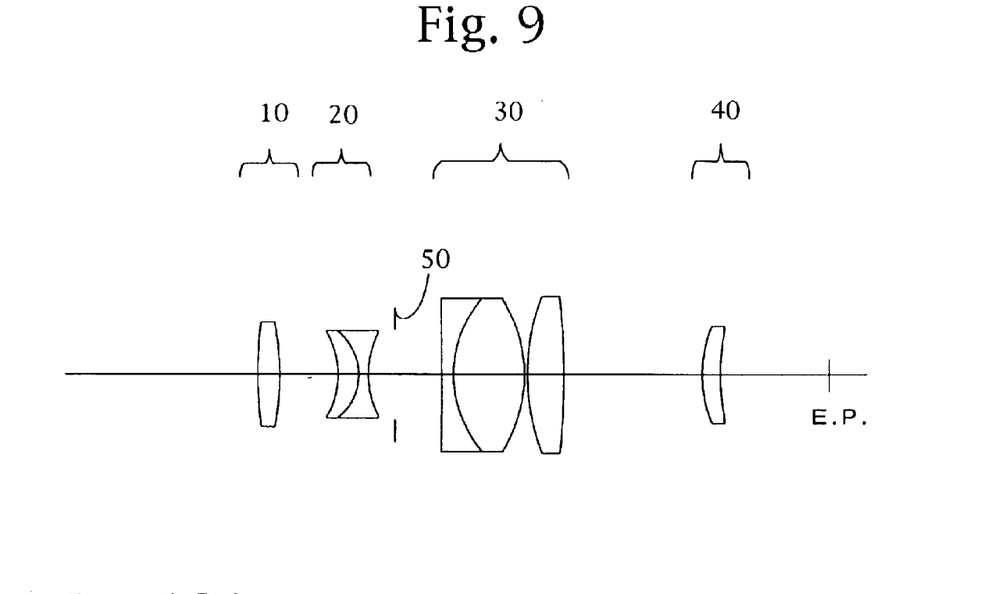
FIG. 9 is a lens arrangement of a zoom eyepiece optical system at the long focal length extremity (the minimum magnification), according to a third embodiment of the present invention.
Figures 10A, 10B:
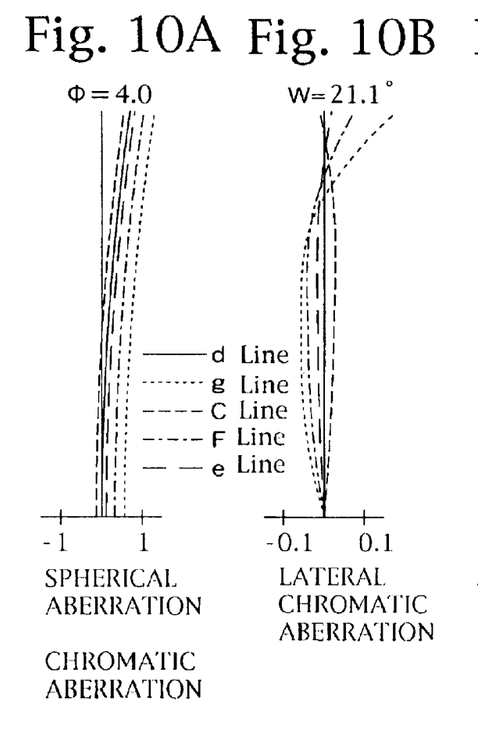
FIGS. 10A, 10B, 10C and 10D show aberrations occurred in the lens arrangement of FIG. 9, in the case where the zoom eyepiece optical system is combined with an objective optical system (f=500, f-number=1:5) having no aberrations, and where a bundle of light rays from infinity is passed therethrough.
Figure 10C:
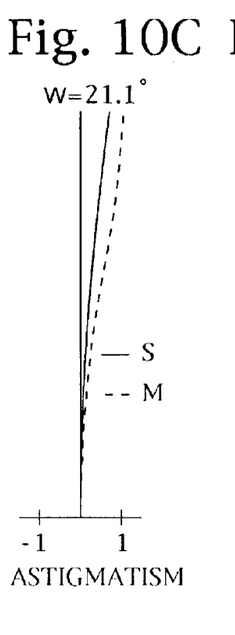
Figure 10D:
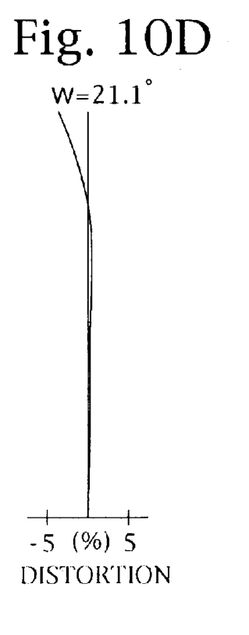
Figure 11:
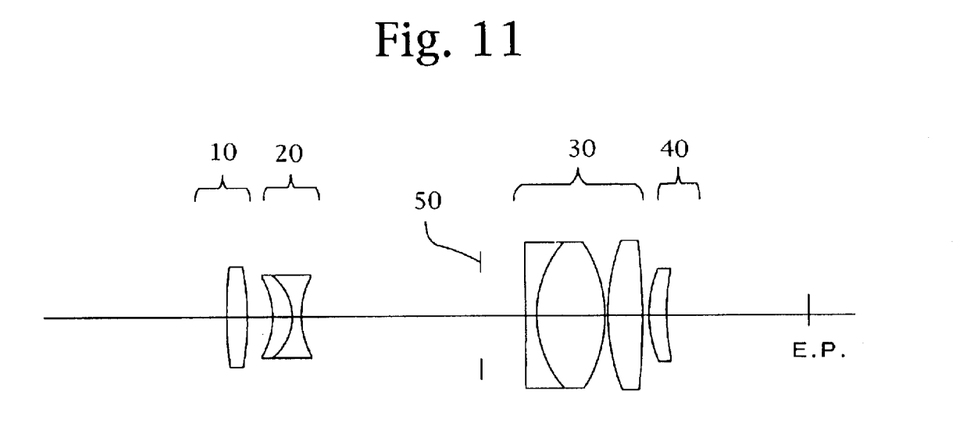
FIG. 11 is a lens arrangement of the zoom eyepiece optical system at the short focal length extremity (the maximum magnification), according to the third embodiment of the present invention.
Figures 12A, 12B:
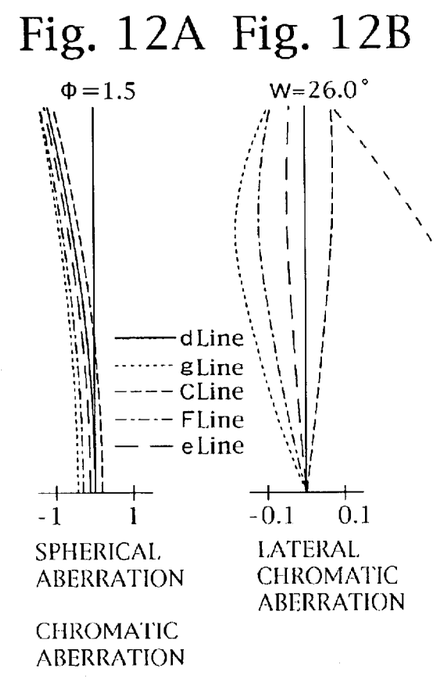
FIGS. 12A, 12B, 12C and 12D show aberrations occurred in the lens arrangement of FIG. 11, in the case where the zoom eyepiece optical system is combined with an objective optical system (f=500, f-number=1:5) having no aberrations, and where a bundle of light rays from infinity is passed therethrough.
Figure 12C:
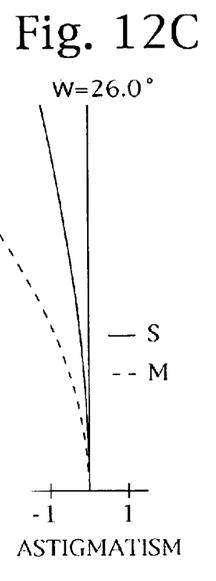
Figure 12D:
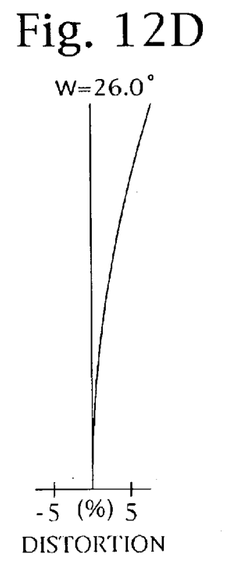

FIG. 9 is the lens arrangement of a zoom eyepiece optical system at the long focal length extremity (the minimum magnification), according to the third embodiment of the present invention. FIGS. 10A through 10D show aberrations occurred in the lens arrangement of FIG. 9, in the case where the zoom eyepiece optical system is combined with an objective optical system (f=500, f-number=1:5) having no aberrations, and where a bundle of light rays from infinity is passed therethrough. FIG. 11 is the lens arrangement of the zoom eyepiece optical system at the short focal length extremity (the maximum magnification), according to the third embodiment of the present invention. FIGS. 12A through 12D show aberrations occurred in the lens arrangement of FIG. 11, in the case where the zoom eyepiece optical system is combined with an objective optical system (f=500, f-number=1:5) having no aberrations, and where a bundle of light rays from infinity is passed therethrough. Table 3 shows the numerical data of the third embodiment.

The basic lens arrangement is the same as that of the first embodiment. The field-frame ring 50 is provided 8.15 mm from the positive third lens group 30 (surface No. 6) toward the negative second lens group 20 side, and moves together with the positive third lens group 30.

TABLE 3

Object Distance = 26.80
f = 19.98 – 12.42 – 7.78
EP = 8 – 8 – 15
Di = –1.0 – –1.0 – –1.0

| Surface No. | R | D | Nd | ν |
|---|---|---|---|---|
| 1 | 75.852 | 3.80 | 1.49176 | 57.4 |
| 2* | –45.871 | 10.12–6.72–4.60 | — | — |
| 3 | –14.159 | 3.54 | 1.85026 | 32.3 |
| 4 | –9.482 | 1.65 | 1.51454 | 54.7 |
| 5 | 15.170 | 12.89–25.30–41.00 | — | — |
| 6 | –767.478 | 2.00 | 1.84666 | 23.8 |
| 7 | 20.227 | 12.30 | 1.72916 | 54.7 |
| 8 | –24.412 | 0.50 | — | — |
| 9 | 37.926 | 6.20 | 1.69680 | 55.5 |
| 10 | –126.420 | 23.79–14.78–1.20 | — | — |
| 11 | 22.116 | 3.16 | 1.51633 | 64.1 |
| 12 | 39.569 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0 | 0 | 0 | $0.77000 \times 10^{-9}$ |

Table 4 shows the numerical values of each condition for each embodiment.

TABLE 4

| | Embod. 1 | Embod. 2 | Embod. 3 |
|---|---|---|---|
| Condition (1) | 0.79 | 0.80 | 0.70 |
| Condition (2) | 0.20 | $-1.1 \times 10^{-4}$ | 0.34 |
| Condition (3) | 0.92 | 0.76 | 0.85 |
| Condition (4) | 1.15 | 0.99 | 1.07 |

As can be understood from Table 4, each embodiment satisfies each condition. Furthermore, as can be understood from the aberration diagrams, the various aberrations are relatively well corrected.

According to the above description, a zoom eyepiece optical system having a small lens diameter can be achieved.

What is claimed is:

1. A zoom eyepiece optical system, used in combination with an objective optical system, comprises a first lens group that is stationary with respect to said objective optical system, a negative second lens group that is movable upon zooming, a positive third lens group that is movable upon zooming, and a stationary positive fourth lens group, in this order from said objective optical system, wherein upon zooming from the long focal length extremity to the short focal length extremity of said zoom eyepiece optical system, said negative second lens group and said positive third lens group move away from each other; and wherein an intermediate image is formed between said negative second lens group and said positive third lens group.

2. The zoom eyepiece optical system according to claim 1, satisfying the following conditions:

$$0.6 < m1 < 0.95$$

$$-0.05 < fL/f1 < 0.5$$

wherein m1 designates the lateral magnification of the first lens group when the diopter of a bundle of light rays emitted from the zoom eyepiece optical system is −1 (1/m);

fL designates the focal length of the entire zoom eyepiece optical systems at the long focal length extremity; and f1 designates the focal length of said first lens group.

3. The zoom eyepiece optical system according to claim 1, satisfying the following condition:

$$0.6 < fS_{3-4}/fL < 1.0$$

wherein $fS_{3-4}$ designates the combined focal length of said positive third lens group and said positive fourth lens group at the short focal length extremity, and fL designates the focal length of the entire zoom eyepiece optical systems at the long focal length extremity.

4. The zoom eyepiece optical system according to claim 1, satisfying the following condition:

$$0.9 < fL_{3-4}/fL < 1.2$$

wherein $fL_{3-4}$ designates the combined focal length of said positive third lens group and said positive fourth lens group at the long focal length extremity, and fL designates the focal length of the entire zoom eyepiece optical systems at the long focal length extremity.

5. The zoom eyepiece optical system according to claim 1, wherein said first lens group comprises a single lens element.

* * * * *